United States Patent
Komatsu et al.

[11] Patent Number: 6,097,879
[45] Date of Patent: Aug. 1, 2000

[54] VIDEO CAMERA APPARATUS OF DIGITAL RECORDING TYPE

[75] Inventors: Hiroyuki Komatsu, Yokohama; Akihito Nishizawa, Yokosuka; Tomoya Hoshi, Yokohama; Toshiro Kinugasa, Hiratsuka, all of Japan

[73] Assignee: Hitachi, Ltd., Tokyo, Japan

[21] Appl. No.: 08/832,162

[22] Filed: Apr. 2, 1997

[30] Foreign Application Priority Data

Apr. 4, 1996 [JP] Japan .................................... 8-082736
Apr. 19, 1996 [JP] Japan .................................... 8-098286

[51] Int. Cl.[7] .................................................. H04N 5/95
[52] U.S. Cl. ............................. 386/85; 386/91; 386/117
[58] Field of Search .................................. 386/38, 39, 95, 386/96, 97, 117, 98, 99, 20, 91; 358/909.1, 906; 348/705, 706, 222, 231, 232, 239, 512, 722, 548; 352/8, 25, 31, 37, 95

[56] References Cited

U.S. PATENT DOCUMENTS

| 4,763,203 | 8/1988 | Oldershaw et al. | 386/20 |
| 5,557,335 | 9/1996 | Oh | 348/512 |
| 5,615,056 | 3/1997 | Oguro | 386/95 |
| 5,774,623 | 6/1998 | Maeda et al. | 386/98 |
| 5,805,214 | 9/1998 | Nishizawa et al. | 348/231 |

FOREIGN PATENT DOCUMENTS 3-229588  10/1991  Japan .
8-32851   2/1996   Japan .
92-14267  7/1992   Rep. of Korea .

*Primary Examiner*—Wendy Garber
*Assistant Examiner*—Christopher Onuaku
*Attorney, Agent, or Firm*—Antonelli, Terry, Stout & Kraus, LLP

[57] ABSTRACT

A digital recording/reproducing video camera apparatus which externally receives analog video and audio signals as a standard video signal for data compression and recording. Selection switches for switching between a camera pick-up mode and a line input mode are switched to their terminals a in the camera pick-up mode and switched to their terminals b in the line input mode. An output signal of a CCD is sent via an amplifier, the switch and an A/D converter to a digital signal processing circuit to generate color and luminance signals. The generated color and luminance signals are fed to a data compression/expansion circuit to remove redundant parts therefrom and then sent to a HDD for recording. In a line input record mode, a line input signal is supplied through the switch and A/D converter to the digital signal processing circuit to generate the color and luminance signals. The generated color and luminance signals are fed to the data compression/expansion circuit to remove redundant parts therefrom and sent to the HDD for recording. The video camera apparatus may include a video signal processing circuit for detecting a time base error in 1 sampling period or less of the synchronization signal caused by performing Y/C separating/demodulating operations on a digital signal and moves a center of a video part in response to its detection result.

10 Claims, 12 Drawing Sheets

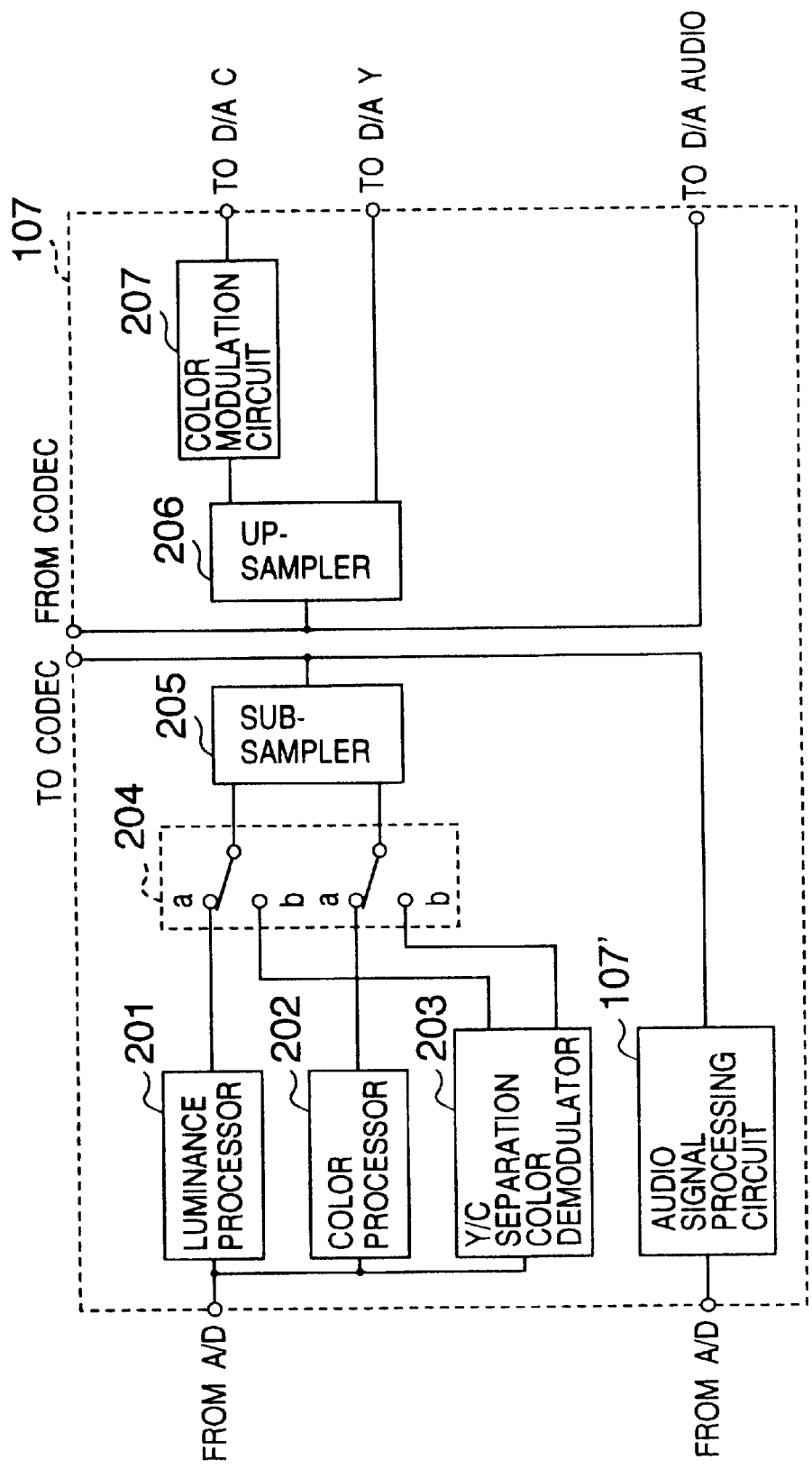

VIDEO CAMERA APPARATUS OF DIGITAL RECORDING TYPE

BACKGROUND OF THE INVENTION

The present invention relates to a digital recording type video camera and more particularly, to a video camera apparatus which compresses and records video and audio signals obtained by a video camera based on a data compression technique such as MPEG (moving picture experts group: moving picture compression specifications) and then reproduces and expands the signal data.

In prior art video camera apparatuses of a digital recording type for recording a signal in a digital recording system, video and audio data signals picked up by an image pick-up element or a microphone are converted to digital signals, subjected to various sorts of digital signal processing operations, to removal of redundant parts therefrom or data compressing operation, and then recorded in a recording medium such as video tape.

SUMMARY OF THE INVENTION

If a video camera apparatus for recording a signal in a digital recording system could receive external analog standard video and audio signals from TV broadcasting, analog video deck or the like, could convert the signals into digital signals, compress and then record the data within the video camera; it would be convenient.

In the above prior art apparatuses, however, it has been impossible to receive, compress and record such standard video signals such as analog video and audio signals.

If digital recording type video camera apparatuses could receive and record reproduced signals (analog standard video/audio signals) from a video cassette recorder (VCR), then this would be convenient. However, a reproduced video signal issued from a VCR generally has a fluctuation component caused by a jitter in a tape running mechanism. The fluctuation component appears in the form of a calculation error at the time of processing a digital signal. This also leads to a cause of increasing an amount of data at the time of data compression.

A technique for producing a standard video signal without jitter from a VCR reproduced signal having a jitter is disclosed in "5-4 Time-base Corrector", Itoh et al., The Institute of Television Engineers of Japan, 1977, No. 10, pp. 771–777. In this technique, it is considered that a clock signal having a frequency of 4 times that of a subcarrier locked to a reproduced signal having jitter is generated, A/D conversion and writing to a RAM memory are carried out based on the clock signal, the video signal written in the memory still having the time base error is read out with a stable clock pulse signal locked to a reference synchronization signal to be thereby converted to a standard video signal without the time base error.

The above prior art technique for generating the standard video signal without any jitter component, however, requires, in addition to a reference clock oscillator for generating a reference synchronization signal, provision of oscillators locked to the VCR reproduced signal, for example, two voltage control oscillators (VCOs), which inevitably increases its circuit scale.

In the digital recording type video camera apparatus, the inventors of the present application have found that, when a composite color signal is converted to a digital signal, this involves a fluctuation in the time base.

More in detail, when a synchronization signal is separated from a digital composite color signal which has been converted to a digital signal using a clock signal not synchronized with the horizontal period of an input signal and Y/C separation and demodulation are carried out based on the synchronization signal, the synchronization signal separated from the digital composite color signal is time-shifted in synchronization position from an analog composite color signal prior to the conversion to a digital signal.

Thus, when the signal after the demodulation is reproduced on a monitor based on the separated synchronization signal, a fluctuation appears on the display screen of the monitor. Further, even when the synchronization signal is separated by an analog circuit, introduction of this synchronization signal into the aforementioned Y/C separation and demodulation digital circuit similarly involves a time shift, thus causing a fluctuation on the display screen.

Known a prior art for correcting a time base fluctuation in a video signal is such a technique as disclosed in the book, entitled "All about VCRs", written by Ekisui Harada, Dempa Shinbunsha, 1990, p258, wherein a video signal is sampled with a clock signal in synchronism with an input signal and written in a memory matrix to be read out therefrom with a clock signal in synchronism with a reference signal. In this prior art technique, however, no consideration is paid to correction of a time shift caused by conversion of a composite color signal to a digital signal.

It is therefore an object of the present invention to realize a video camera apparatus which can receive an external standard video signal such as an analog video or audio signal and can compress and record it.

Another object of the present invention is to realize a video camera apparatus which can receive, e.g., an external VCR reproduced video signal having a jitter, can remove the jitter from the received reproduced video signal with a simple circuit, and can compress and record it.

A further object of the present invention is to provide a video signal processing device which can correct a time shift caused by conversion of a composite color signal to a digital signal, in particular, a time shift caused by introduction of a synchronization component contained in the composite color signal, and can suitably process all signals in the form of digital signals based on a single clock signal.

In accordance with an aspect of the present invention, the above objects are attained by providing a video camera apparatus which comprises a selection switch for switching between internal and external video signals, a signal processing circuit for generating at least color and luminance signals from the video signal selected by the selection switch, and a data compressor for compressing data.

In the invention, the selection switch switches between the internal video signals of the video camera apparatus and the external video signal, and the color and luminance signals are generated from the video signal issued from the selection switch. When these color and luminance signals are arranged to be compressed, there can be realized a video camera apparatus which receives an external analog video signal and compresses it.

In accordance with another aspect of the present invention, there is provided a video camera apparatus which comprises an image pick-up element; a video signal processing circuit for processing a video signal read out from the image pick-up element; a microphone; an audio signal processing circuit for processing an audio signal received from the microphone; a data compressor for removing a redundant part of an output signal of the video signal processing circuit to compress data; a first selection switch disposed between the image pick-up element and the video signal processing circuit and having a first video input terminal for receiving the video signal from the image pick-up element and a second video input terminal for receiving an external video signal; and a second selection switch disposed between the microphone and the video signal processing circuit and having a first audio input terminal for receiving an audio signal from the microphone and a second audio input terminal for receiving an external audio signal, wherein the first and second selection switches select whether the video signal from the image pick-up element and the audio signal from the microphone are processed by the video signal processing circuit and audio signal processing circuit or the external video and audio signals are processed by the video signal processing circuit and audio signal processing circuit.

In accordance with a further aspect of the present invention, there is provided a video camera apparatus which comprises an image pick-up element; an A/D converter for converting an analog video signal received from the image pick-up element into a digital video signal; a video signal processing circuit for converting the digital video signal received from the A/D converter into a standard TV signal; a data compressor for removing a redundant part of an output signal of the video signal processing circuit to compress data; and a selection switch disposed between the image pick-up element and the A/D converter and having a first video input terminal for receiving the video signal from the image pick-up element and a second video input terminal for receiving an external video signal, wherein the selection switch selects whether the video signal of the image pick-up element is processed through the A/D converter and the video signal processing circuit or the external video signal is processed through the A/D converter and the video signal processing circuit.

In accordance with yet another aspect of the present invention, there is provided a video camera apparatus which comprises an image pick-up element; an A/D converter for converting an analog video signal received from the image pick-up element into a digital video signal; a video signal processing circuit for converting the digital video signal received from the A/D converter into a standard TV signal; a data compressor for removing a redundant part of an output signal of the video signal processing circuit to compress data; a second A/D converter for receiving an external video signal; and a selection switch for receiving an output signal of the first A/D converter and an output signal of the second A/D converter, selecting either one of the output signal of the first A/D converter and the output signal of the second A/D converter and sending the selected signal to the signal processing circuit, wherein the selection switch selects whether the video signal processing circuit processes the output signal from the image pick-up element or the external video signal.

In accordance with yet a further aspect of the present invention, there is provided a video camera apparatus which comprises an image pick-up element; a first A/D converter for converting an analog video signal received from the image pick-up element into a digital video signal; a microphone; a second A/D converter for converting an audio signal received from the microphone into a digital audio signal; signal processing circuits for converting the digital video and audio signals received from the first and second A/D converters into digital standard TV signals; D/A converters for converting the digital standard TV signals received from the signal processing circuits into analog standard TV signals; a data compressor for removing redundant parts from the standard TV signals received from the signal processing circuits; a recording medium for recording therein video and audio data compressed by the data compressor; a first selection switch disposed between the image pick-up element and the first A/D converter and having a first video input terminal for receiving the video signal from the image pick-up element and a second video input terminal for receiving the external video signal; and a second selection switch disposed between the microphone and the second A/D converter and having a first audio input terminal for receiving the audio signal from the microphone and a second audio input terminal for receiving the external audio signal, wherein the first and second selection switches select whether the video signal from the image pick-up element and the audio signal from the microphone are converted by the processing circuits into the digital standard TV signals or the external video and audio signals are converted by the signal processing circuits into the digital standard TV signals.

In accordance with a still further aspect of the present invention, there is provided a video camera apparatus which comprises an image pick-up element; an A/D converter for converting an analog video signal received from the image pick-up element into a digital video signal; a signal processing circuit for converting the digital video signal of the A/D converter into a digital standard TV signal; a D/A converter for converting the digital standard TV signal received from the signal processing circuit into an analog standard TV signal; a data compressor for removing a redundant part from the standard TV signal received from the signal processing circuit to compress data; a recording medium for recording therein the video data compressed by the data compressor; and a first selection switch disposed between the image pick-up element and the A/D converter and having a first video input terminal for receiving the video signal from the image pick-up element and a second video input terminal for receiving an external video signal, wherein the selection switch selects whether the video signal from the image pick-up element is converted by the signal processing circuit into the digital standard TV signal or the external video signal is converted by the signal processing circuit to the digital standard TV signal.

In accordance with an additional aspect of the present invention, there is provided a video camera apparatus which comprises an image pick-up element; a first A/D converter for converting an analog video signal received from the image pick-up element into a digital video signal; a signal processing circuit for converting the digital video signal of the first A/D converter into a digital standard TV signal; a D/A converter for converting the digital standard TV signal received from the signal processing circuit into an analog standard TV signal; a data compressor for removing a redundant part from the standard TV signal received from the signal processing circuit to compress data; a recording medium for recording therein the video data compressed by the data compressor; and a second A/D converter for receiving an external video signal, wherein the selection switch selects whether to send the output signal of the first A/D converter to the signal processing circuit or to send the output signal of the second A/D converter to the signal processing circuit.

Preferably, the signal processing circuit of the above video camera apparatus includes a reference clock generator; a synchronization signal generator for generating a reference synchronization signal on the basis of a reference clock signal received from the reference clock signal generator; an A/D converter for converting the internal and external video signals to a digital video signal; a synchronization signal separating circuit for separating a synchronization signal from the digital video signal converted by the A/D converter; a RAM memory circuit for writing therein the digital video signal converted by the A/D converter according to the reference clock signal of the reference clock signal generator and for reading out the stored digital video signal therefrom according to the reference clock signal of the reference clock signal generator; difference detecting means for detecting an error or difference between the synchronization signal generated by the synchronization signal generator and the synchronization signal separated by the synchronization signal separating circuit; and an electronic zoom circuit (horizontal time-base correcting circuit) for performing time-base correcting operation on the digital video signal stored in the RAM memory circuit.

The period of the synchronization signal separated from the reproduced video signal having a jitter is counted using the reference clock signal of the reference clock signal generator to detect a difference or time base error with a pre-generated reference synchronization signal, and then the signal having the jitter read out from the RAM memory circuit is expanded or compressed by a reciprocal of the detected time base error by the electronic zoom circuit. As a result, there is implemented a video camera apparatus which can remove the jitter from the reproduced input video signal with a simple circuit and compress and record it.

Preferably, the above synchronization signal separating circuit separates the synchronization signal from the analog video composite signal supplied to the A/D converter.

In accordance with another aspect of the present invention, there is provided a video signal processing circuit which includes means, when the synchronization signal is separated from the digital composite color signal, for calculating a time difference between a time when the composite color signal reaches a reference level of separating the synchronization signal and a time when the synchronization signal is actually separated by the synchronization signal separating circuit on the basis of at least two levels of the composite color signal immediately before and after the reference level and on the basis of the reference level nearly at a rising or falling edge of the synchronization signal of the composite color signal, for finding video data at a point shifted by the above time shift through interpolation based on actually sampled points when the composite color signal is converted to the digital signal, and for moving the center of the video part of the video signal.

When the synchronization signal is separated by the analog circuit, the video signal processing circuit includes means for calculating a time difference or phase difference between the synchronization signal after introduction of the synchronization signal into the Y/C separation/demodulation digital circuit and the synchronization signal separated by the analog circuit, for finding video data at a point of the composite color signal shifted by the above time difference from the actually-sampled point when the composite color signal is converted to the digital signal, and for moving the center of the video part of the video signal.

BRIEF DESCRIPTION OF THE DRAWINGS

FIG. 2 is a block diagram of an internal structure of a digital signal processing circuit in the embodiment of FIG. 1;

DESCRIPTION OF THE PREFERRED EMBODIMENTS

An embodiment of the present invention will be explained with reference to FIGS. 1 and 2.

Figure 1:
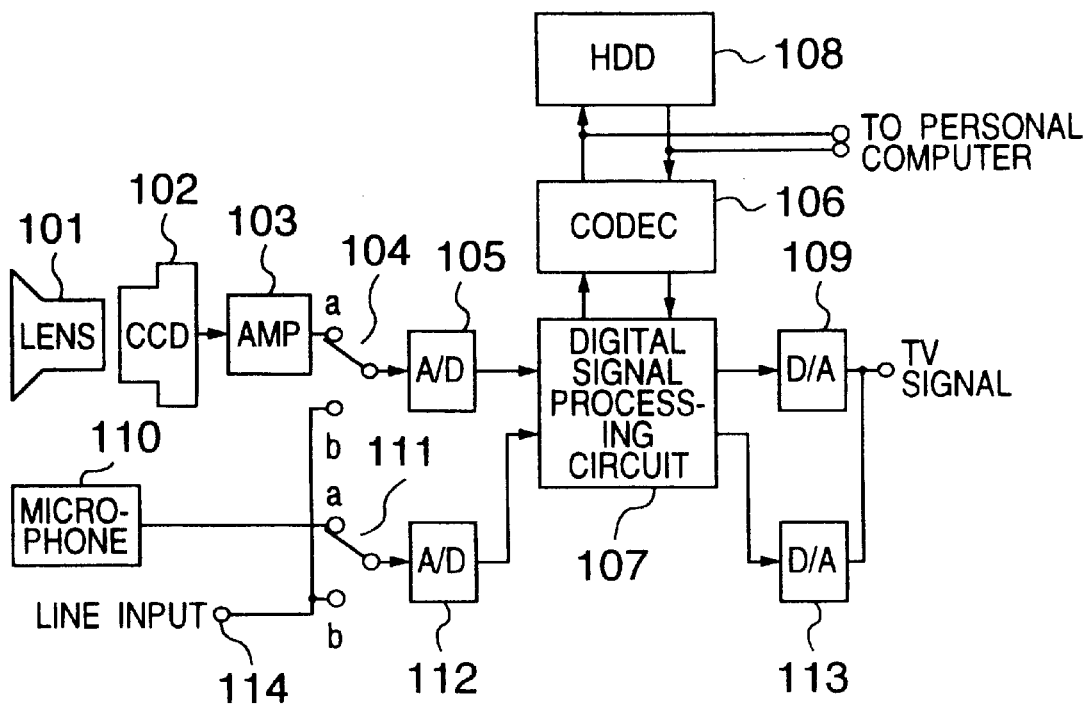
FIG. 1 is a block diagram of a schematic arrangement of a video camera apparatus in accordance with an embodiment of the present invention.

FIG. 1 is a schematic arrangement of a video camera apparatus in accordance with an embodiment of the present invention, which includes a lens 101 for the digital video camera apparatus, an image pick-up element 102 of a CCD (charge coupled device), an analog amplifier 103, a video signal change-over switch (selection switch) 104, an analog/digital (A/D) converter 105 and a data compression/expansion circuit 106. Further included in the video camera apparatus are a digital signal processing circuit 107, a hard disk drive 108, a digital/analog (D/A) converter 109, a microphone 110 for the video camera apparatus, an audio signal change-over switch (selection switch) 111, an A/D converter 112 and a D/A converter 113. Additionally included in the video camera apparatus is a line input terminal 114 through which a video signal such as analog video and audio signals is input from outside of the video camera apparatus thereto.

An image formed on a light receiving face of the CCD image pick-up element 102 through the lens 101 is photoelectrically converted and read out by the CCD image pick-up element 102. An output video signal of the CCD image pick-up element 102 is amplified by the analog amplifier 103 and then supplied to a terminal a (a first video input terminal) of the video signal change-over switch 104. Similarly supplied to a terminal b (a second video input terminal) of the video signal change-over switch 104 is a standard TV video signal or line video signal through the line input terminal 114.

Audio collected by the microphone 110 is converted to an audio signal and then applied to a terminal a (a first audio input terminal) of the audio signal change-over switch 111. Also applied to a terminal b (a second audio input terminal) of the audio signal change-over switch 111 through the line input terminal 114 is a standard TV audio signal or line audio signal.

Explanation will now be made in connection with a case where a video camera pick-up mode is selected. In this connection, the selection of the video camera pick-up mode is carried out by means of a manual input selection switch (not shown) provided to the video camera apparatus. In other words, selection between the video camera pick-up mode and a line input mode is carried out by this input selection switch. In the video camera pick-up mode, the switches 104 and 111 are switched to their terminals a; whereas, in the line input mode, the switches 104 and 111 are switched to their terminals b.

In the video camera pick-up mode, the output video signal of the CCD image pick-up element 102 sent through the analog amplifier 103 and the terminal a of the video signal change-over switch 104 to the A/D converter 105, which in turn converts the received signal to a digital video signal. The output audio signal of the microphone 110 is sent through the terminal a of the audio signal change-over switch 111 to the A/D converter 112, which in turn converts the received signal to a digital audio signal.

The video and audio signals digitally converted are next applied to the digital signal processing circuit 107 to be subjected therein to operations of generating color, luminance and audio signals. Thereafter, the generated color, luminance and audio (digital standard TV signal) signals are sent from the digital signal processing circuit 107 to the data compression/expansion circuit 106 where redundant parts in the color, luminance and audio signals are eliminated and a bit stream based on MPEG (moving picture experts group) or the like is recorded in the hard disk drive 108.

When it is desired to reproduce video and audio signals recorded in the video camera apparatus, that is, in the video camera pick-up mode, the recorded video and audio signals are read out from the hard disk drive 108 to the data compression/expansion circuit 106, and subsequently the circuit 106 subjects the read-out data to its expanding operation. Data subjected to the expanding operation by the data compression/expansion circuit 106 is sent to the digital signal processing circuit 107 to be reproduced thereby. Video and audio signals in the reproduced data are sent from the digital signal processing circuit 107 to the D/A converter 109 and D/A converter 113, respectively. The video and audio signals analog-converted by the D/A converter 109 and D/A converter 113 are externally taken out as an analog standard TV signal.

Explanation will then be made as to a record/reproduction mode for the standard TV signal, i.e., the line input mode. In a line input record mode, first of all, a video signal in a line input signal is supplied via the terminal b of the video signal change-over switch 104 to the A/D converter 105 to be converted to a digital signal; whereas, an audio signal in the line input signal is supplied via the terminal b of the audio signal change-over switch 111 to the A/D converter 112 to be converted to a digital signal.

The digital video and audio signals digital-converted by the A/D converter 105 and A/D converter 112 are applied to the digital signal processing circuit 107, which in turn performs its color/luminance separating operation and color signal demodulating operation to generate color, luminance and audio signals.

Thereafter, as in the above video camera pick-up mode, the generated color, luminance and audio signals are sent from the digital signal processing circuit 107 to the data compression/expansion circuit 106, which in turn eliminates redundant parts in the received color, luminance and audio signals and sends the redundant-part removed signals to the hard disk drive 108 for recording. When it is desired to reproduce the recorded line input signal, this is exactly the same operation as in the aforementioned video camera reproduction mode and thus explanation thereof is omitted. In this connection, a method of recording data in a hard disk is disclosed in U.S. patent application Ser. No. 08/512,625 filed on Aug. 8, 1995 and entitled "Ultra Small Video Camera and a Video Camera System", the disclosure of which is hereby incorporated by reference.

Output data of the data compression/expansion circuit 106 may be supplied through an interface to a personal computer, or data may be supplied from the personal computer through the interface to the data compression/expansion circuit 106. In this case, an output video signal of the CCD image pick-up element 102 or a video signal as a line input signal can be compressed and sent to the personal computer.

Next, the internal structure of the digital signal processing circuit 107 will be explained in detail by referring to FIG. 2. In the drawing, reference numeral 201 denotes a luminance processing circuit, 202 a color processing circuit, 203 a Y/C separation color demodulation circuit Y/C separation color demodulation circuit 203. An output signal is supplied from the A/D converter 105 to these luminance processing circuit 201, color processing circuit 202 and Y/C separation color demodulation circuit 203. Numeral 204 denotes a change-over switch, 205 a sub-sampling circuit, 206 an up-sampling circuit, 207 a color modulation circuit, 107' an audio signal processing circuit.

The luminance processing circuit 201 and color processing circuit 202 generate a luminance signal and a color differential signal from a video signal obtained from the CCD image pick-up element 102, respectively. The Y/C separation color demodulation circuit 203 separates a composite video signal received from the line input terminal 114 into a luminance signal and a modulation color differential signal, and further demodulates the separated modulation color differential signal to a color differential signal.

The change-over switch 204, under the influence of the aforementioned manual input selection switch (not shown), is switched to the terminal a when the video camera pick-up mode; and is switched to the terminal b when the line input mode. And the change-over switch 204 selects ones of output signals of the luminance processing circuit 201, color processing circuit 202 and Y/C separation color demodulation circuit 203 according to the above mode; and then supplies the selected signals to the sub-sampling circuit 205.

The sub-sampling circuit 205 performs its sub-sampling operation on a digital component video signal of 4:2:2 or 4:1:1 received from the change-over switch 204 to obtain an SIF signal of 4:2:0 conforming to the input specifications of the data compression/expansion circuit 106. The up-sampling circuit 206 converts the SIF signal of 4:2:0 received from the data compression/expansion circuit 106 to the original component video signal of 4:2:2 or 4:1:1. Thereafter, the color differential signal is converted by the color modulation circuit 207 to the modulation color differential signal which in turn is sent together with the luminance signal to the D/A converter 109.

In this way, by processing the video signal received from the A/D converter 105 switchably between the camera pick-up mode and the line input mode and sending it to the data compression/expansion circuit 106, the digital signal processing circuit 107 can process the externally-input video signal in such a manner as suitable for video compression. In this connection, the audio signal received from the A/D converter 112 is subjected by the audio signal processing circuit 107' to a band width limitation or the like and then sent to the data compression/expansion circuit 106.

In this way, in accordance with the present embodiment, the video signal change-over switches 104 and 111 are added to the digital recording/reproducing video camera apparatus to switchinably perform the signal operation of the digital signal processing circuit 107 between the video camera pick-up mode and the line input mode in which a standard TV signal, etc. is externally input, whereby not only the video output signal of the CCD image pick-up element 102 and the audio output signal of the microphone 110 but also the analog video/audio signals externally input can be subjected to a data compression for recording/reproduction.

Although the so-called composite video signal corresponding to the modulated color signal superimposed on the luminance signal has been explained as the externally-input line video signal in the foregoing example, it goes without saying that even such a system as to supply the component video signal, that is, the color and luminance signals separatedly can be realized merely by adding a single A/D converter.

Further, though the above explanation has been made with use of the hard disk drive as a medium for recording the compressed video signal in the foregoing example, the recording may be realized, if necessary, with use of other recording medium such as video tape or flash memory.

Figure 3:
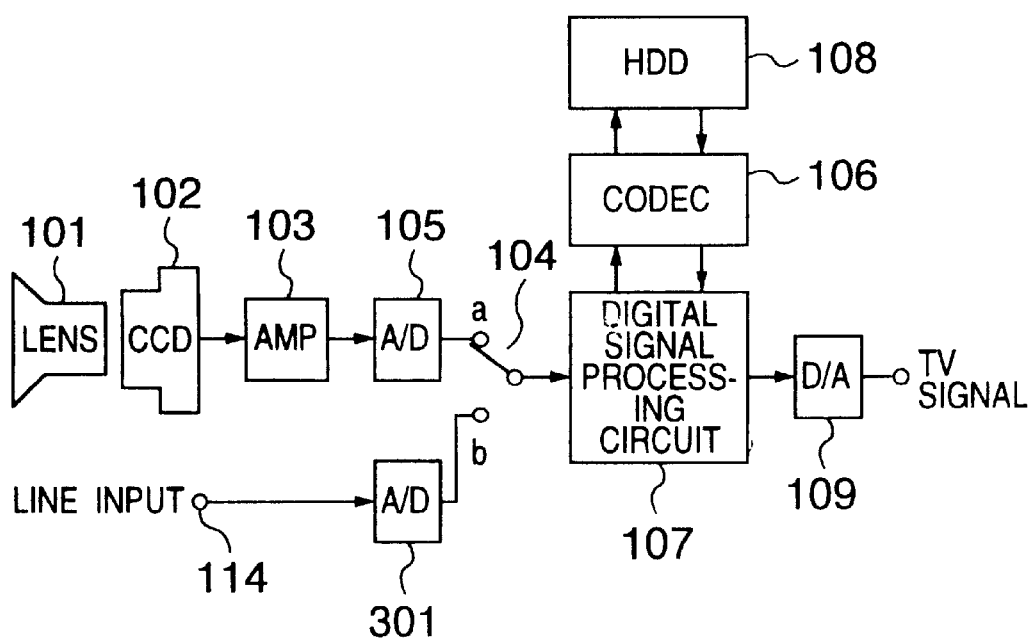
FIG. 3 is a block diagram of a schematic arrangement of a video camera apparatus in accordance with another embodiment of the present invention.

Shown in FIG. 3 is a schematic arrangement of a video camera apparatus in accordance with another embodiment of the present invention, in which a video signal received from the CCD image pick-up element 102 is passed through the analog amplifier 103 and A/D converter 105 and then applied to the terminal a of the video signal change-over switch 104. Meanwhile, a line video signal received at the line input terminal 114 is passed through a second A/D converter 301 and then applied to the terminal b of the video signal change-over switch 104.

Though omitted in the drawing, a circuit for processing the audio signal is the same as that in the embodiment of FIG. 1. An audio output signal of the microphone 110 is applied to the terminal a of the audio signal change-over switch 111, while an audio signal in the line input signal is applied to the terminal b of the audio signal change-over switch 111. An output signal of the change-over switch 111 is input to the digital signal processing circuit 107 through the A/D converter 112. The other parts are substantially the same as those in the embodiment of FIG. 1 and thus are omitted in the drawing.

In the present embodiment, since the conversion of the input video signal to the digital signal is separately carried out between the camera pick-up and line input modes with use of the separate A/D converters 105 and 301; in addition to the obtained effect of the first embodiment of FIG. 1, there can be obtained an effect that the digital conversion suitable for each input can be carried out.

Figure 4:
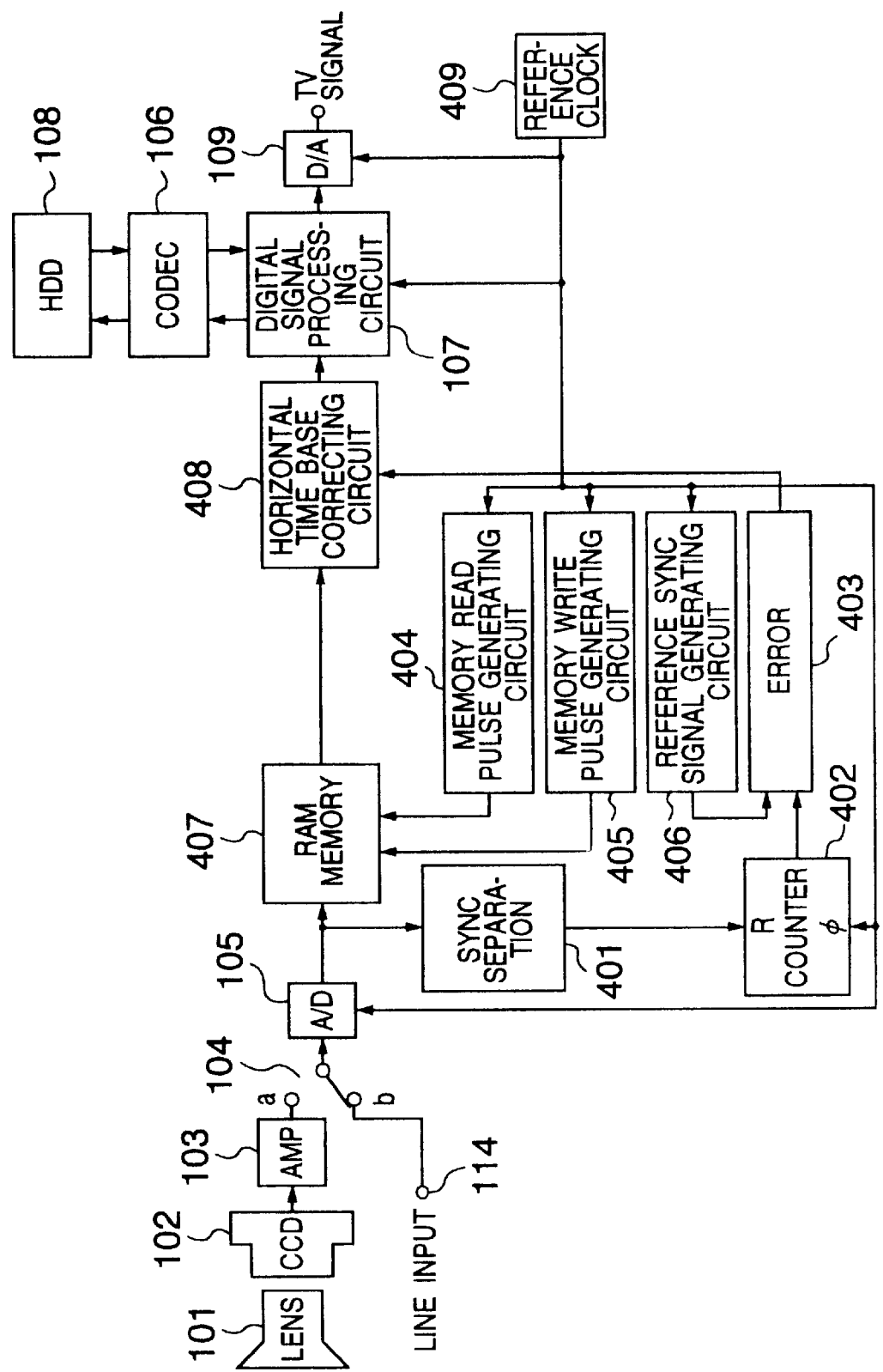
FIG. 4 is a block diagram of a schematic arrangement of a video camera apparatus in accordance with a further embodiment of the present invention.
Figure 5:
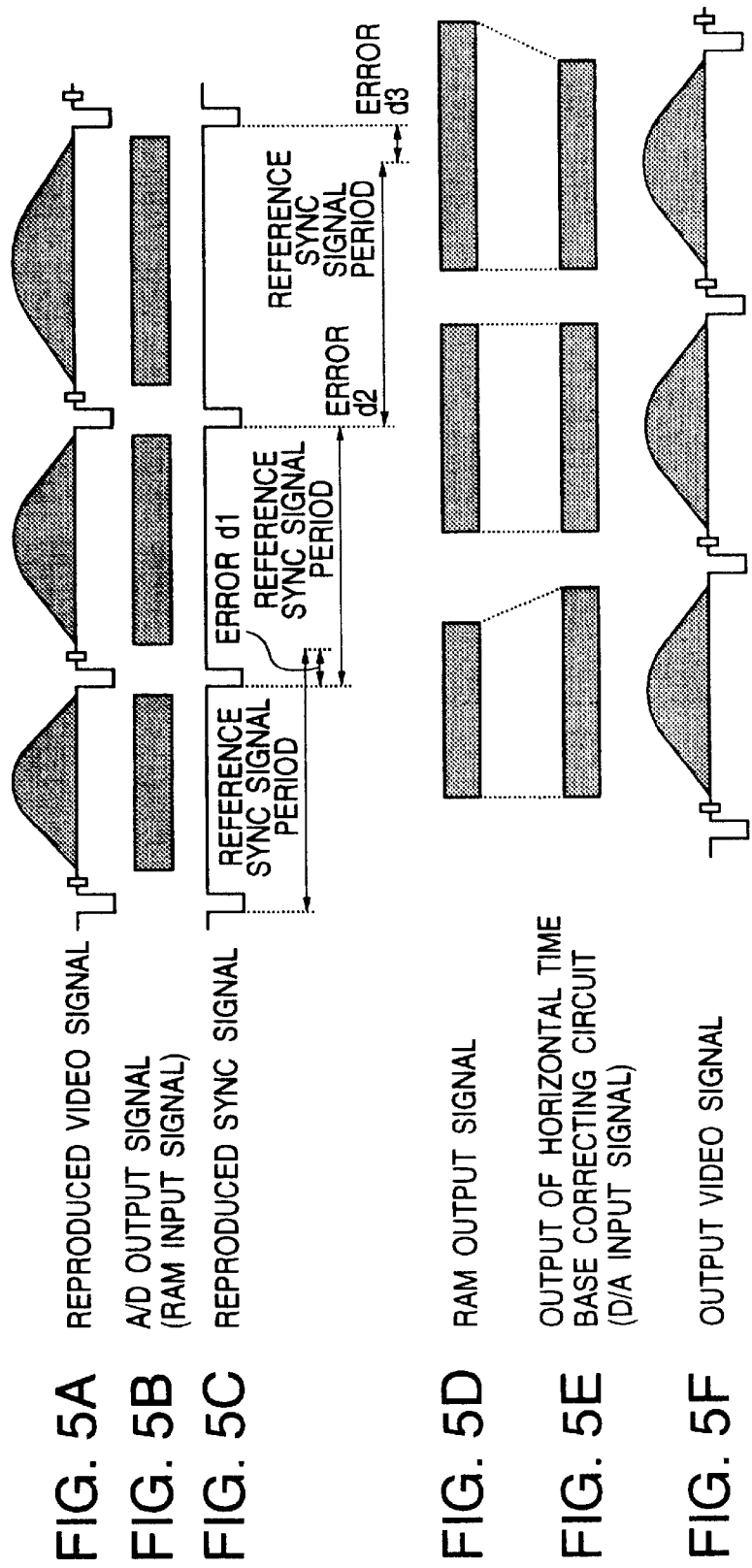
FIGS. 5A, 5B, 5C, 5D, 5E and 5F are diagrams for explaining signals appearing in the embodiment of FIG. 4.

Turning to FIG. 4, there is shown a schematic arrangement of a video camera apparatus in accordance with a further embodiment of the present invention, in which parts having the same functions as those in the embodiment of FIG. 1 are denoted by the same reference numerals or symbols. In FIG. 4, further, as in the example of FIG. 3, a circuit for processing an audio signal, which is the same as that in the example of FIG. 1, is omitted. More specifically, an audio output signal of the microphone 110 is supplied to the terminal a of the audio signal change-over switch 111, while an audio signal in a line input signal is supplied to the terminal b of the audio signal change-over switch 111. An output signal of the audio signal change-over switch 111 is supplied via the A/D converter 112 to the digital signal processing circuit 107.

In FIG. 4, reference numeral 401 denotes a synchronization signal separation circuit, 402 a counter, 403 a comparator (error detecting means), 409 a reference clock generator. Further included in FIG. 4 are a memory read pulse generating circuit 404, a memory write pulse generating circuit 405 and a reference synchronization signal generating circuit 406. These pulse generating circuits 404 and 405 output a memory read pulse signal and a memory write pulse signal based on a reference clock signal received from the reference clock generator, respectively. Also included in the drawing are a RAM memory circuit 407 and a horizontal time-base correcting circuit (electronic zoom circuit) 408. The other circuits and blocks are the same as those in the embodiment of FIG. 1. The horizontal time-base correcting circuit 408, which comprises a known electronic zoom circuit, is arranged to compress or expand only a horizontal time base.

FIGS. 5A to 5F show timing charts of signals appearing in the embodiment of FIG. 4 including a reproduced VCR signal input and a signal after correction.

A video signal (shown in FIG. 5A) having a jitter component reproduced by a video tape recorder (VCR) is sent via the line input terminal 114 and video signal change-over switch 104 to the A/D converter 105 to be converted therein to a digital signal. The video signal digitally converted is applied to the RAM memory circuit 407 and also to the synchronization signal separation circuit 401.

The synchronization signal separation circuit 401 separates a reproduced synchronization signal (shown in FIG. 5C) from the received digital video signal and then input it to a reset terminal of the counter 402. The counter 402 in turn counts the period of the above reproduced synchronization signal based on the reference clock signal received from the reference clock generator 409, and applies it to the comparator 403. The reference synchronization signal generating circuit 406 applies the reference synchronization signal generated based on the reference clock signal received from the reference clock generator 409 to the comparator 403 which in turn compares the signal received from the counter 402 with the signal received from the reference synchronization signal generating circuit 406 and calculates a difference or error (d1–d3) therebetween.

Simultaneously with it, the video signal (shown in FIG. 5B) digitally converted by the A/D converter 105 is written in the RAM memory circuit 407 according to a write pulse received from the memory write pulse generating circuit 405. Thereafter, the horizontal time-base correcting circuit (electronic zoom circuit) 408 reads out a video signal (shown in FIG. 5D) from the RAM memory circuit 407 at a suitable time according to a read pulse from the memory read pulse generating circuit 404, subjects it to a time base conversion to obtain a D/A input signal (shown in FIG. 5E), and then applies it to the digital signal processing circuit 107.

The video signal processed by the digital signal processing circuit is sent from the digital signal processing circuit 107 via the data compression/expansion circuit 106 to the hard disk drive 108. The video signal reproduced through the hard disk drive 108 and data compression/expansion circuit 106 is sent from the digital signal processing circuit 107 to the D/A converter 109 to be converted to an analog signal and be output as a TV signal (shown in FIG. 5F).

Now applied to the horizontal time-base correcting circuit 408 is the calculated difference or error (d1–d3) from the comparator 403. In this case, an amount of conversion in the time base expansion or compression in the horizontal time-base correcting circuit 408 is determined by the difference (d1–d3) calculated by the comparator 403. That is, when the time base conversion is carried out by a reciprocal (1/(d1–d3)) of the difference between the reproduced synchronization signal having a jitter and reference synchronization signal, the jitter component contained in the reproduced video signal can be equivalently corrected.

In the embodiment of FIG. 4, it is impossible to correct a jitter component within one clock of the reference clock signal. However, when the reference clock signal is set to have a frequency of, e.g., 4 fsec. (14.3 MHz), the amount of jitter is about 0.5 mm on a 20 inch monitor that is practically insignificant. Further, the jitter amount can be reduced by using a high-rate reference clock signal.

In this way, in accordance with the embodiment of FIG. 4 of the present invention, in addition to the effect obtained by the embodiment of FIG. 1, it is unnecessary to provide a voltage control oscillator (VCO) to synchronize with the reproduced signal, the present embodiment can require only the reference clock generator with a simple structure, generate a standard signal corresponding to the reproduced VCR video signal as a nonstandard signal with the jitter removed therefrom for recording and reproduction.

In the embodiment of FIG. 4, blocks other than the reference clock generator 409, lens 101, CCD image pick-up element 102, analog amplifier 103 and hard disk drive 108 can be made in the form of a single IC, thereby realizing a compact circuit configuration.

Although the synchronization signal separation circuit 401 separates the synchronization signal from the digital video signal in the embodiment of FIG. 4, the same effect as this may be attained by an analog synchronization signal separating circuit which separates the synchronization signal from the video signal prior to the digital conversion and inputs it to the counter 402.

The above embodiment arranged as mentioned above has an effect which follows.

The video camera apparatus comprises the switch for selectively switching between the internal and external video signals, the signal processing circuit for generating at least color and luminance signals from the video signal selected by the switch, and the data compressor for removing redundant parts from the output signal of the signal processing circuit and subjecting it to a data compression. Therefore, there can be realized a video camera apparatus which externally receives an analog video signal and compresses it.

In the above video camera apparatus, the signal processing circuit includes the reference clock signal generator, the synchronization signal generator, the A/D converter for converting the video signal to the digital video signal, the synchronization signal separating circuit for separating the synchronization signal from the digital video signal, the RAM memory circuit for writing therein or reading therefrom the digital video signal according to the reference clock signal of the reference clock signal generator, the difference detection circuit for detecting a difference or error between the synchronization signal generated by the synchronization signal generator and the synchronization signal separated by the synchronization signal separating circuit, and the horizontal time base correcting circuit for performing its time base correcting operation on the digital video signal stored in the RAM memory circuit based on a correction based on the difference detected by the difference detection circuit.

Therefore, the period of the synchronization signal separated from the reproduced synchronization signal having a jitter is counted based on the reference clock signal of the reference clock signal generator, a difference with the previously-generated reference synchronization signal, i.e., a time base error is detected, and then the signal having the jitter read out from the RAM memory circuit is expanded or compressed by a reciprocal of the detected time base error by the horizontal time base correcting circuit. As a result, there can be implemented a video camera apparatus which removes the jitter from the input reproduced video signal with use of a simple circuit, performs data compressing and recording operations.

Figure 6:
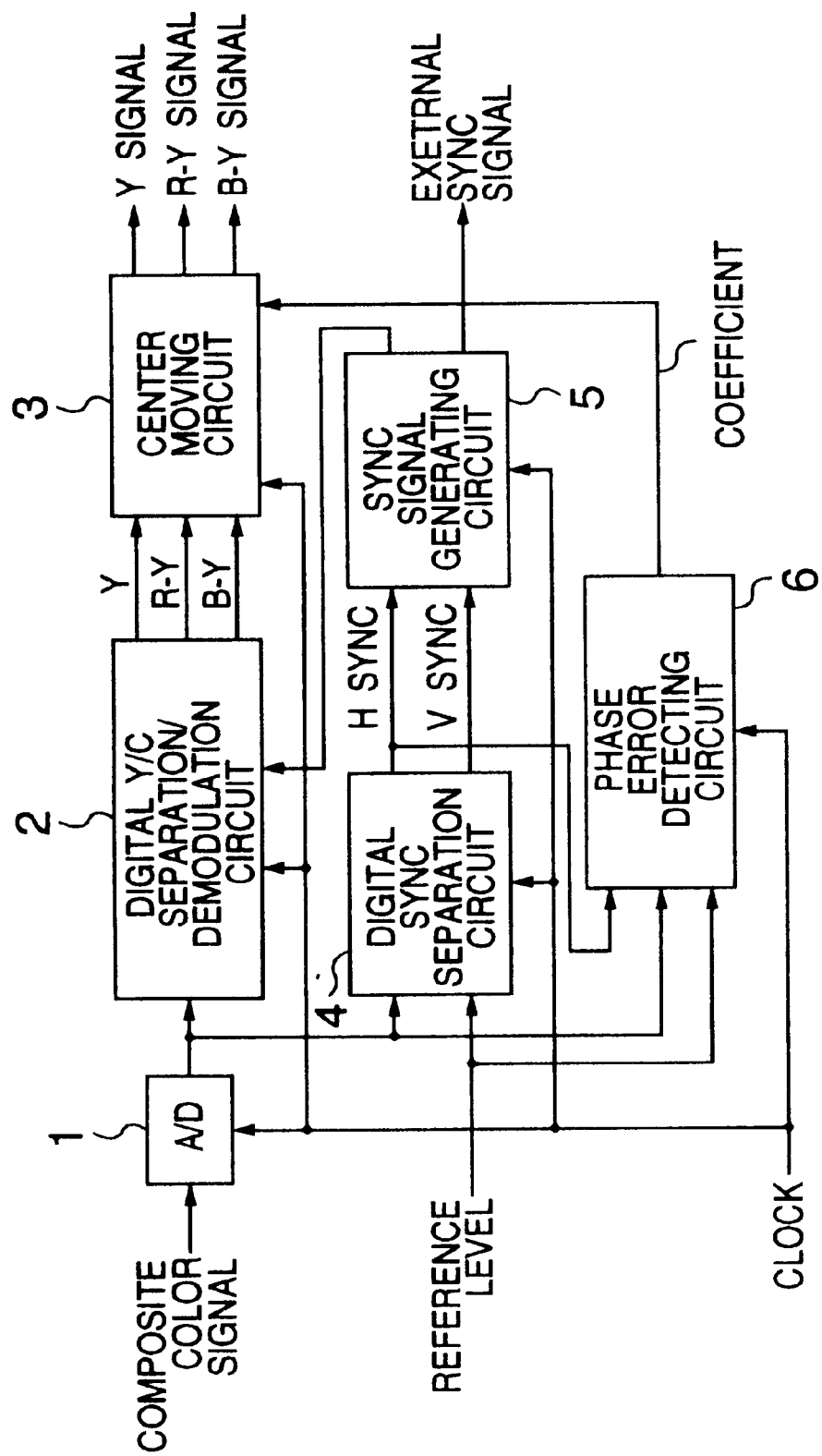
FIG. 6 is a block diagram of a structure of a video signal processor in accordance with another embodiment of the present invention.

FIG. 6 is a block diagram of an arrangement of a video signal processor in accordance with yet another embodiment of the present invention. The video signal processor of the present embodiment is arranged to remove a jitter based on a quantization error of one clock or less at the A/D converter for the video signal. The illustrated video signal processor includes an A/D converter 1, a digital Y/C separation/demodulation circuit 2, a center moving circuit 3, a digital synchronization signal separating circuit 4, a synchronization signal generating circuit 5, and a phase error detecting circuit 6.

In the present embodiment, a composite color signal is applied to the A/D converter 1; an output of the A/D converter 1 is applied to the digital Y/C separation/demodulation circuit 2, digital synchronization signal separating circuit 4 and phase error detecting circuit 6; a luminance output (Y signal) and two color differential signals (R–Y signal and B–Y signal) of the digital Y/C separation/demodulation circuit 2 are applied to the center moving circuit 3; an H synchronization output of the digital synchronization signal separating circuit 4 is applied to the synchronization signal generating circuit 5 and phase error detecting circuit 6; a V synchronization output of the digital synchronization signal separating circuit 4 is applied to the synchronization signal generating circuit 5; a coefficient output of the phase error detecting circuit 6 is applied to the center moving circuit 3; one of the two outputs of the synchronization signal generating circuit 5 is applied to the digital Y/C separation/demodulation circuit 2 and the other is output as an external synchronization signal; a reference level signal is externally applied to the digital synchronization signal separating circuit 4 and phase error detecting circuit 6; a clock signal is applied to the A/D converter 1, digital Y/C separation/demodulation circuit 2, center moving circuit 3, digital synchronization signal separating circuit 4, synchronization signal generating circuit 5 and phase error detecting circuit 6; whereby the center moving circuit 3 outputs a luminance signal (Y signal) and two color differential signals (R–Y and B–Y signals).

With the present embodiment arranged as mentioned above, the A/D converter 1 converts the composite color signal to a digital signal, the digital synchronization signal separating circuit 4 compares the digital signal with the reference level signal and separates the horizontal and vertical synchronization signals (H and V synchronization signals) from the digital composite color signal. The digital Y/C separation/demodulation circuit 2 generates the luminance signal (Y signal) and two color differential signals (R–Y and B–Y signals) from the digital composite color signal, on the basis of a signal generated by the synchronization signal generating circuit 5 based on the H and V synchronization signals separated by the digital synchronization signal separating circuit 4. Since the sampling operation of the A/D converter 1 results in generation of a phase error or difference between the synchronization signal contained in the analog composite color signal before A/D conversion and the H synchronization signal separated by the digital synchronization signal separating circuit 4, the phase error detecting circuit 6 calculates the phase error on the basis of the H synchronization signal separated by the digital synchronization signal separating circuit 4 and values of the composite color signal before and after reaching nearly the reference level, and the center moving circuit 3, according to the phase error, moves the centers of the luminance signal and two color differential signals in the video part of the video signal.

In the present embodiment, when the center of the signal in video period is moved, fluctuations in the time base caused by separating the synchronization signal from the digital composite color signal can be suppressed. Since no line memory is used and Y/C separation/demodulation can be realized with a single clock, the Y/C separation/demodulation can be advantageously realized with a less number of gates.

Figure 7:
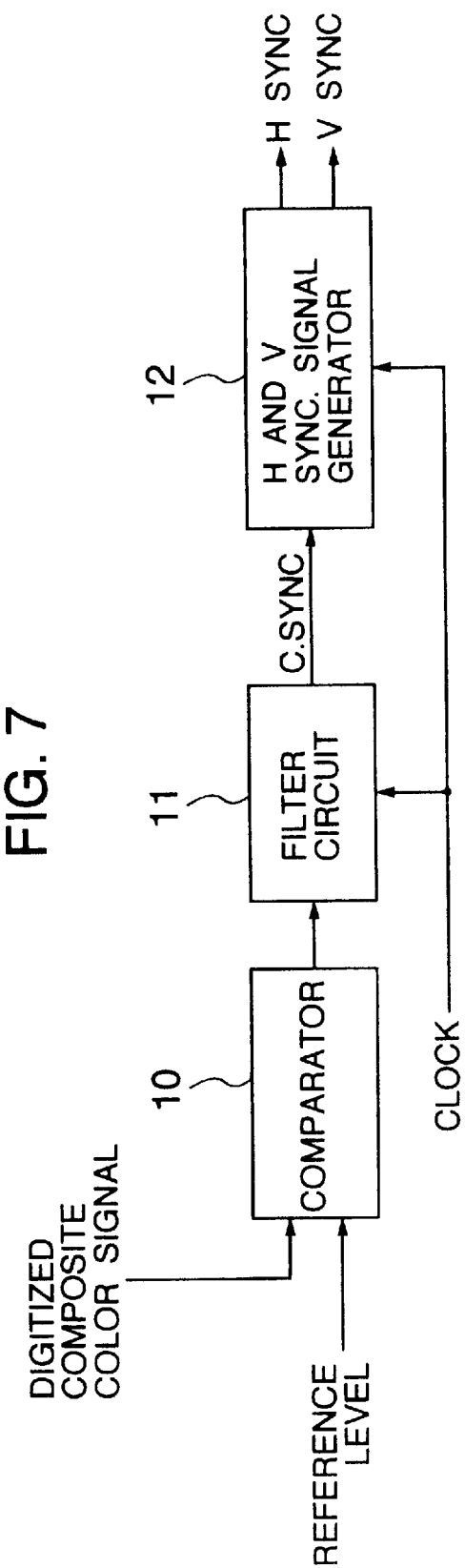
FIG. 7 is a block diagram of an exemplary structure of a digital synchronization/separation circuit in FIG. 6.

FIG. 7 is a block diagram of an exemplary structure of the digital synchronization signal separating circuit 4 in FIG. 6. In FIG. 7, numeral 10 denotes a comparison circuit, 11 a filter circuit, 12 an H and V synchronization signal generating circuit.

In the example of FIG. 7, the comparison circuit 10 compares the digital composite color signal with the reference level signal, extracts a synchronization signal component from the composite color signal, and sends the extracted signal to the filter circuit 11. The filter circuit 11 removes a noise component from the received signal to separate a composite synchronization signal (C.SYNC) therefrom, and sends it to the H and V synchronization signal generating circuit 12. The circuit 12 generates an H synchronization signal and a V synchronization signal from the received composite synchronization signal.

Figure 8:
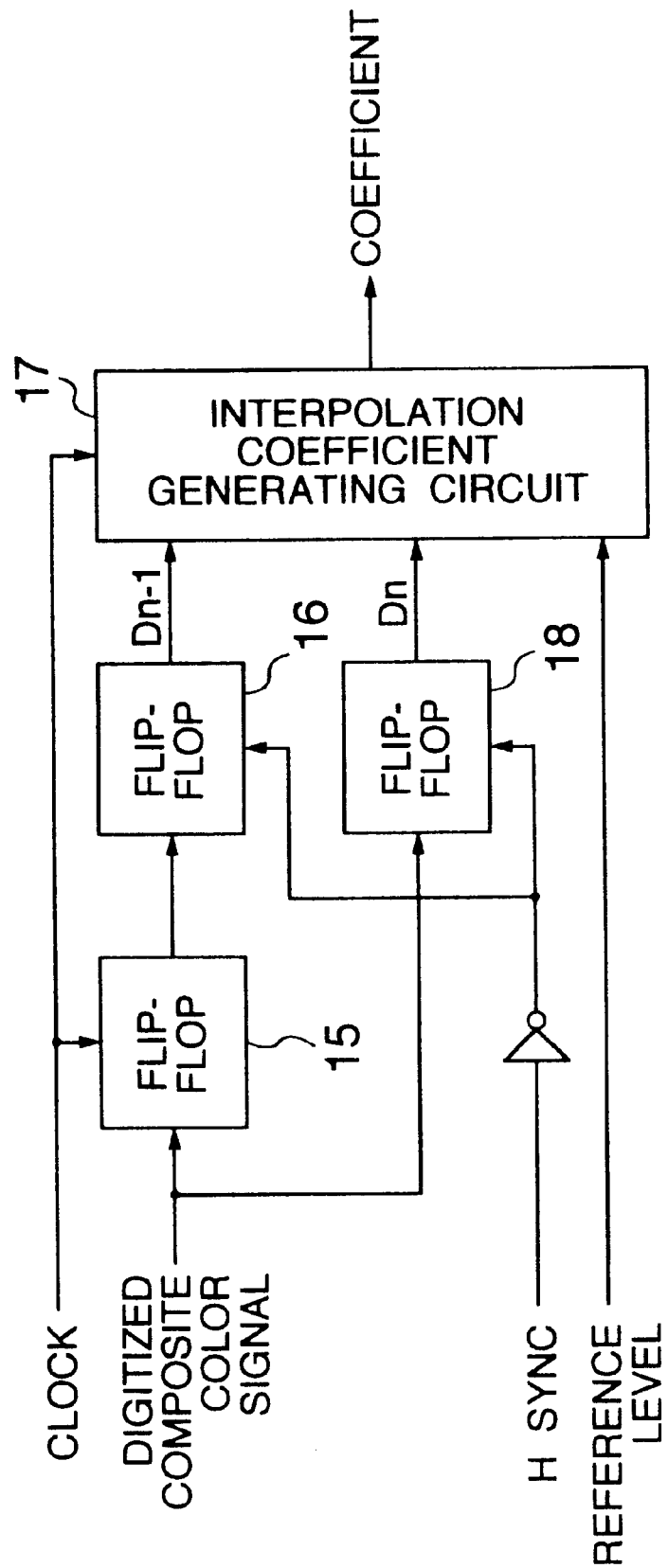
FIG. 8 is a block diagram of an exemplary structure of a phase error detection circuit in FIG. 6.
Figure 9:
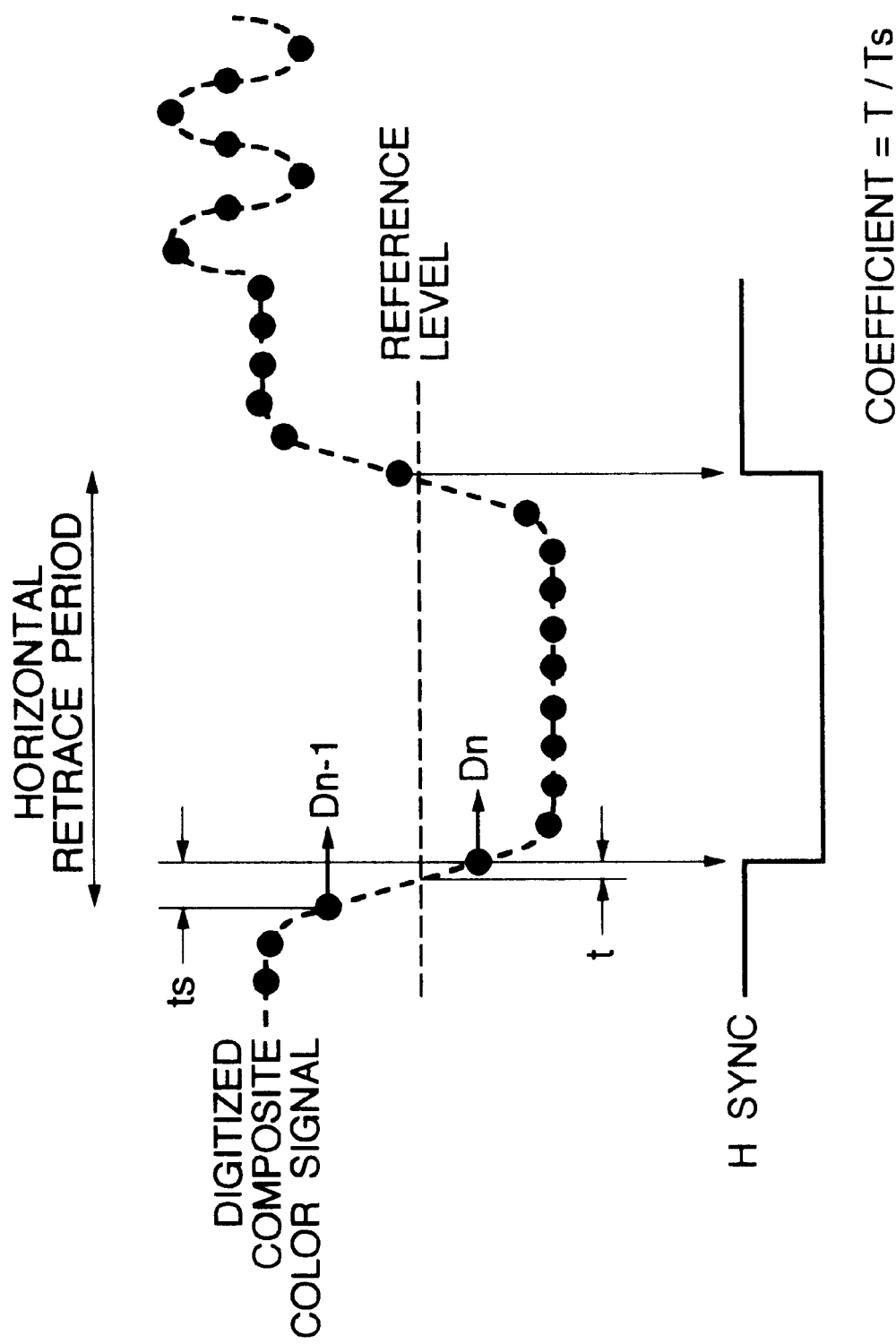
FIG. 9 is a diagram for explaining the operation of the circuit of FIG. 8.

FIG. 8 is a block diagram of an exemplary structure of the phase error detecting circuit 6 in FIG. 6, and FIG. 9 is a diagram for explaining the operation of the circuit of FIG. 8. In FIG. 8, numerals 15, 16 and 18 denote flip-flops, 17 an interpolation coefficient generating circuit.

In the example of FIG. 8, the flip-flop 15 delays the digital composite color signal by an amount corresponding to one clock, the flip-flops 16 and 18 hold the delayed composite synchronization signal and the composite color signal prior to delay, respectively, for one horizontal period at a falling edge of the H synchronization signal received from the digital synchronization signal separating circuit 4. The flip-flops 16 and 18 hold sampling data (signal level values) at points ($D_{n-1}$) and $D_n$ in FIG. 9. The interpolation coefficient generating circuit 17, on the basis of the reference level between the above two signal levels and the signal levels at the points $D_{n-1}$ and $D_n$, detects a time shift t between a rising timing of the H synchronization signal and a moment when the composite color signal reaches the reference level, divides the time shift t by a sampling period $t_s$ of the composite color signal to generate a coefficient ($t/t_s$).

Figure 10:
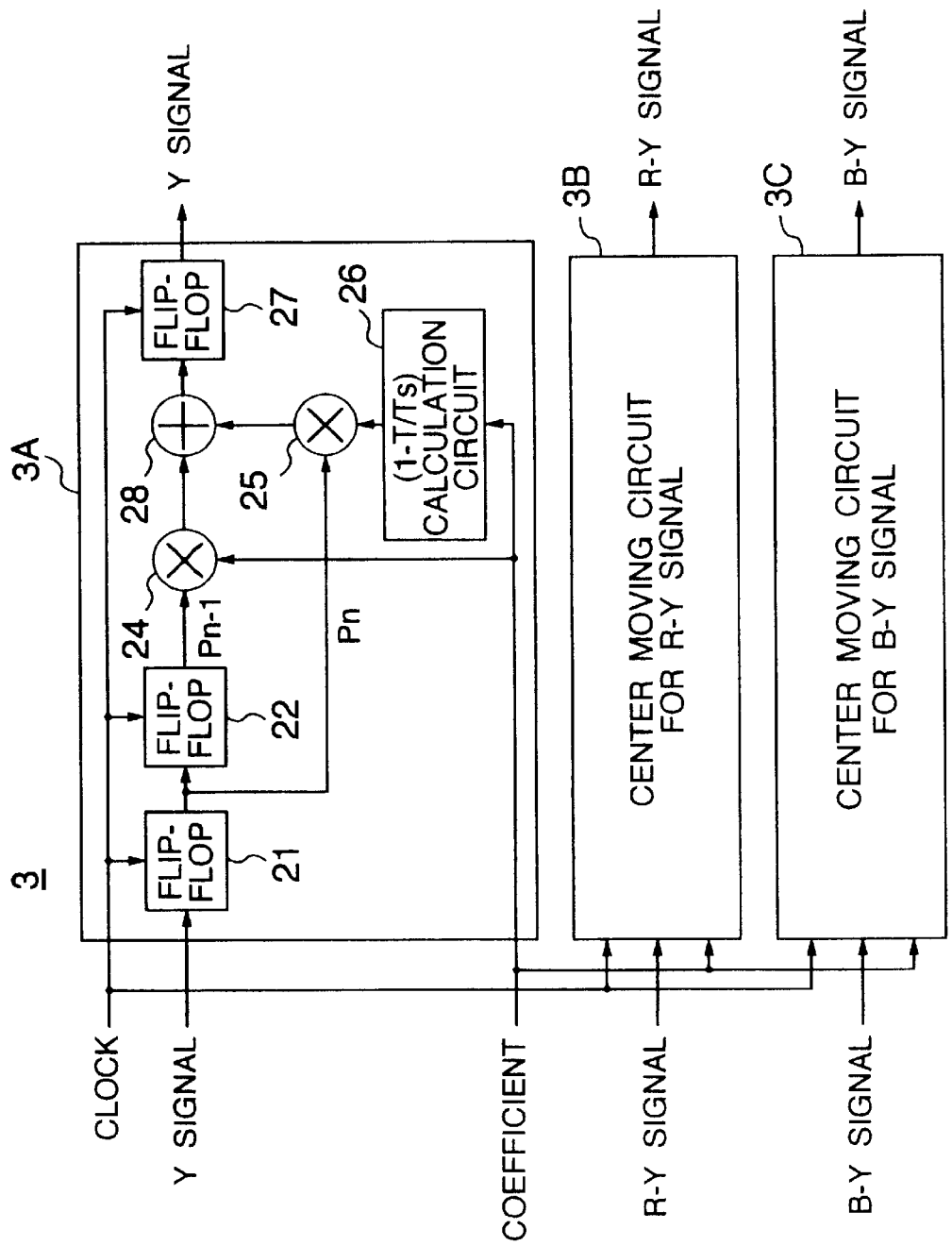
FIG. 10 is a block diagram of an exemplary structure of a center moving circuit in FIG. 6.

FIG. 10 is a block diagram of an exemplary structure of the center moving circuit 3 in FIG. 6. In FIG. 10, reference symbol 3A denotes center moving circuit for Y signal, 3B a center moving circuit for R–Y signal, 3C a center moving circuit for B–Y signal, 21, 22 and 27 flip-flops, 24 and 25 multiplication circuits, 28 an addition circuit, 26 a ($1-t/t_s$) calculation circuit.

The center moving circuits 3A, 3B and 3C in this example, on the basis of the coefficient signal received from the phase error detecting circuit 6, calculate interpolation data from the luminance signal (Y signal) and color differential signals (R–Y and B–Y signals) received from the digital Y/C separation/demodulation circuit 2. Since the operation and arrangement of the luminance are the as those for the color differential signal, explanation will be made in connection with the luminance signal (Y signal) as an example.

In the center moving circuit 3A of the example of FIG. 10, the flip-flop 21 picks up and holds the Y signal at a rising edge of the clock signal and the flip-flop 22 delays an output of the flip-flop 21 by one clock. The multiplication circuit 24 multiplies an output ($Pn_{n-1}$) of the flip-flop 22 by the coefficient signal received from the phase error detecting circuit 6, the multiplication circuit 25 multiplies an input Pn of the flip-flop 22 by an output coefficient signal of the ($1-t/t_s$) calculation circuit 26 calculating the coefficient signal received from the phase error detecting circuit 6, the addition circuit 28 adds together output results of the multiplication circuits 25 and 24 to obtain an addition result, the flip-flop 27 picks up and holds the addition result and outputs its output as a new Y signal.

In other words, in this example, according to the result of the phase error detecting circuit 6, a signal in the video signal part is re-calculated by performing interpolating operation with use of data before and after the signal.

Explanation will then be made as to yet a further embodiment of the present invention.

Figure 11:
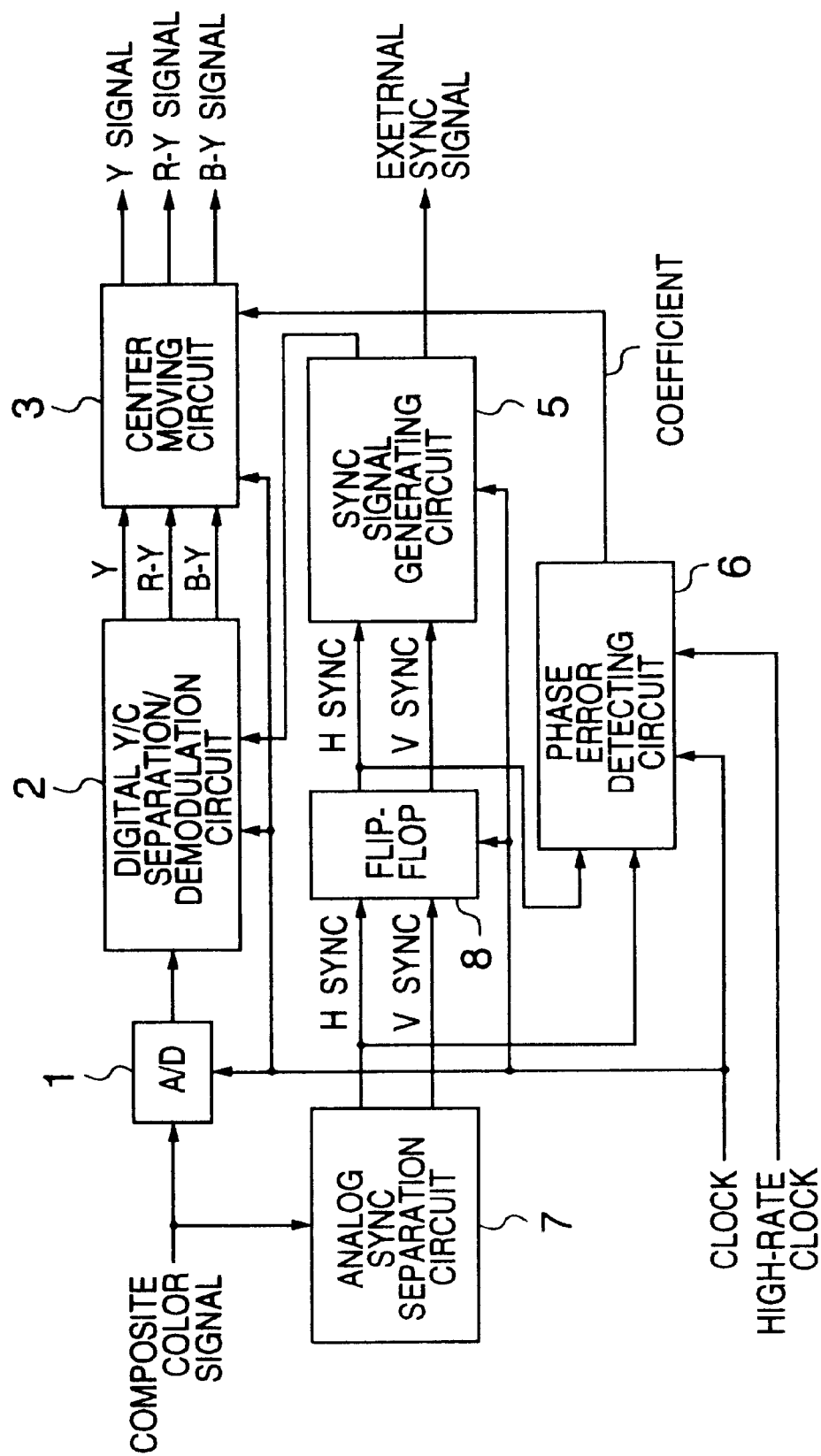
FIG. 11 is a block diagram of a structure of a video signal processor in accordance with yet another embodiment of the present invention.
Figure 12:
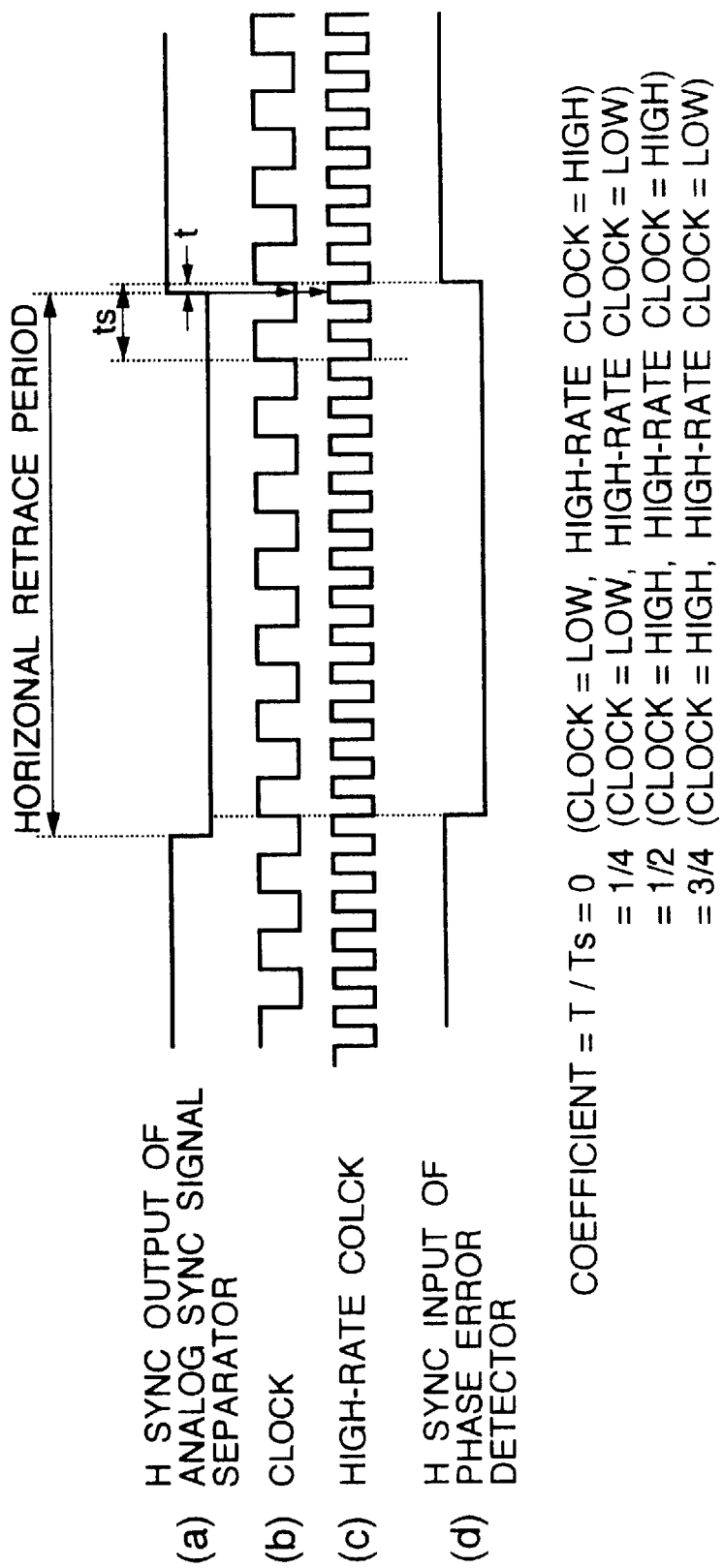
FIG. 12 is a timing chart showing the operation of a phase error detection circuit in FIG. 11.

FIG. 11 is a block diagram of a structure of a video signal processor in the further embodiment of the present invention, and FIG. 12 is a timing chart for explaining the operation of the phase error detecting circuit 6 in FIG. 11. In FIG. 11, numeral 1 denotes an A/D converter, 2 a digital Y/C separation/demodulation circuit, 3 a center moving circuit, 5 a synchronization signal generating circuit, 6 a phase error detecting circuit, 7 a analog synchronization signal separating circuit, 8 a flip-flop.

In the present embodiment, a composite color signal is applied to the A/D converter 1 and analog synchronization signal separating circuit 7; an output of the A/D converter 1 is applied to the digital Y/C separation/demodulation circuit 2; a luminance output (Y signal and two color differential signals (R–Y and B–Y signals) of the digital Y/C separation/demodulation circuit 2 are applied to the center moving circuit 3; two output signals (H and V synchronization signals) of the analog synchronization signal separating circuit 7 are applied to the flip-flop 8; two horizontal and vertical synchronization signals of the flip-flop 8 are applied to the synchronization signal generating circuit 5; one of two outputs of the synchronization signal generating circuit 5 is applied to the digital Y/C separation/demodulation circuit 2 and the other is output as an external synchronization signal; the horizontal synchronization signals of the analog synchronization signal separating circuit 7 and flip-flop 8 are applied to the phase error detecting circuit 6; a coefficient output of the phase error detecting circuit 6 is applied to the center moving circuit 3; an external clock signal is applied to the A/D converter 1, digital Y/C separation/demodulation circuit 2, center moving circuit 3, flip-flop 8, synchronization signal generating circuit 5 and phase error detecting circuit 6 respectively; a high-rate clock signal is applied to the phase error detecting circuit 6; whereby the center moving circuit 3 outputs a luminance signal (Y signal) and two color differential signals (R–Y and B–Y signals).

In the present embodiment arranged as mentioned above, the A/D converter 1 converts the composite color signal to a digital signal, the analog synchronization signal separating circuit 7 separates the horizontal and vertical synchronization signals (H and V synchronization signals) from the analog composite color signal, and the flip-flop 8 holds the H and V synchronization signals at the timing of a rising edge of the clock signal. The digital Y/C separation/demodulation circuit 2 generates the luminance signal and the two color differential signals from the digital composite color signal with use of the H and V synchronization signals held by the flip-flop 8 on the basis of the signal received from the synchronization signal generating circuit 5. Since the flip-flop 8 picks up and holds the synchronization signals at the timing of a rising edge of the clock signal, the synchronization signal contained in the analog composite color signal prior to A/D conversion is different in phase from the synchronization signal held by the flip-flop 8. In view of this, as shown by the timing chart of FIG. 12, the phase error detecting circuit 6 holds the levels of the clock and high-rate clock signals at a change point at which the input H synchronization signal of the flip-flop 8 changes immediately before a change point at which the output H synchronization signal of the flip-flop 8 changes; the phase error detecting circuit 6 finds the above phase difference or error according to the held results; and applies the coefficient signal for calculation to the center moving circuit 3. The center moving circuit 3 in turn operates, according to the received coefficient signal, to move the centers of the luminance and two color differential signals corresponding to the video part of the video signal.

Explanation will next be made in detail as to the operation of the phase error detecting circuit 6 by referring to FIG. 12. In the drawing, (a) shows the horizontal synchronization output signal of the analog synchronization signal separating circuit 7, (b) shows the external clock signal, (c) shows the high-rate clock signal having a frequency corresponding to twice of the frequency of the external clock signal, and (d) shows the horizontal synchronization input signal of the analog synchronization signal separating circuit 7. Reference symbol $t_s$ represents one period of the external clock signal, and t represents a time difference between a rising edge of the horizontal synchronization output signal of the analog synchronization signal separating circuit 7 and a rising edge of the external clock signal. When the rising edge of the horizontal synchronization output signal is located at a position corresponding to a low level of the external clock signal and also to a high level of the high-rate clock signal, the phase difference is regarded as 0 and the coefficient $t/t_s$ is set at 0. When the rising edge of the horizontal synchronization output signal is located at a position corresponding to a low level of the external clock signal and also to a low level of the high-rate clock signal, the phase difference is regarded as ¼ of $t_s$ and the coefficient $t/t_s$ is set at ¼. Similarly, When the rising edge of the horizontal synchronization output signal is located at a position corresponding to a high level of the external clock signal and also to a high level of the high-rate clock signal and when the rising edge of the horizontal synchronization output signal is located at a position corresponding to a high level of the external clock signal and also to a low level of the high-rate clock signal, the coefficient t/ts is set at ½ and ¾, respectively.

In the present embodiment, by moving the centers of the signals in the video period, fluctuations in the time base caused by discretizing the synchronization signals at the flip-flop 8 can be suppressed. Since no line memory is used and the Y/C separation/demodulation can be realized with the single clock signal, the Y/C separation/demodulation can be advantageously implemented with a less number of gates.

As has been explained in the foregoing, in accordance with the above embodiments, the synchronization signals can be separated from the analog composite color signal and fluctuations in the time base caused by taking the synchronization signals in the digital circuit can be corrected with a small-size circuit without using any line memory. Further, the Y/C separation/demodulation can be implemented with a circuit configuration having a single oscillator (clock).

Figure 13:
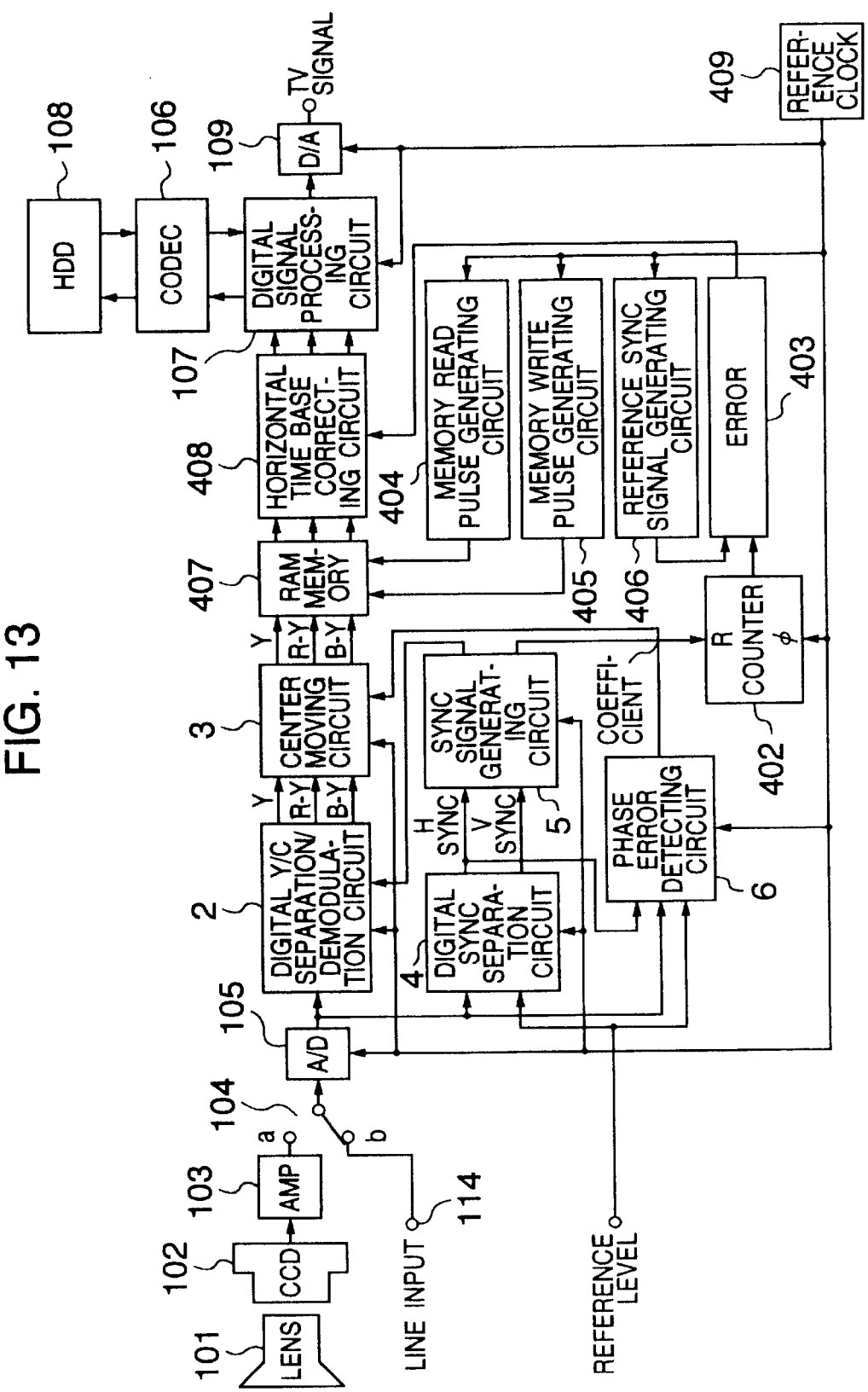
FIG. 13 is a block diagram of a schematic arrangement of a video camera apparatus in accordance with yet another embodiment of the present invention.

Shown in FIG. 13 is yet another embodiment of the present invention, in which means for removing a jitter based on a quantization error of 1 clock or less in an A/D converter 105 is further added to the embodiment of FIG. 4. In FIG. 13, numeral 2 denotes a digital Y/C separation/demodulation circuit, 3 a center moving circuit, 5 a synchronization signal generating circuit, 6 a phase error detecting circuit. The other circuits of FIG. 13 are substantially the same as those in FIG. 4.

In the present embodiment, the A/D converter 105 converts a composite color signal received from the line input terminal 114 into a digital signal, and the digital Y/C separation/demodulation circuit 2 generates a luminance signal (Y signal) and two color differential signals (R–Y and B–Y signals) from the converted digital composite color signal on the basis of a synchronization signal received from the synchronization signal generating circuit 5. The synchronization signal generated by the synchronization signal generating circuit 5, however, has an error of less than 1 clock with respect to the phase of the synchronization signal contained in the original analog composite color signal because the sampling of the A/D converter 105 involves a quantization error (roughness) of less than 1 clock. Accordingly, the luminance signal and two color differential signals generated by the digital Y/C separation/demodulation circuit 2 have also an error, i.e., jitter.

For the purpose of avoiding this, in accordance with the present embodiment, the phase error detecting circuit 6 computes a phase difference or phase error on the basis of the H synchronization signal received from the synchronization signal separation circuit 401, the reference level signal used as a reference when the H synchronization signal is separated and values of the composite color signal before and after the reference level signal; and the center moving circuit 3 moves the centers of the luminance and two color differential signals of the video signal part according to the computed phase difference or error to accommodate the jitter. Further, a circuit similar to that in FIG. 4 is provided at the subsequent stage thereof to thereby correct a fluctuation of 1 clock or more.

In accordance with the present embodiment, the jitter component of less than 1 clock caused by the sampling error of the A/D converter 105 can be absorbed by the center moving circuit 3, a VCR (video cassette recorder) fluctuation greater than the jitter can be corrected by the horizontal time-base correcting circuit 408, and thus a video signal without any fluctuation error can be generated.

While the invention has been particularly described and shown with reference to the preferred embodiments thereof, it will be understood by those skilled in the art that various changes in form and detail and omissions may be made therein without departing from the spirit and scope of the invention.

What is claimed is:

1. A video camera apparatus comprising:
    a selection switch for switching between internal and external video signals; and
    a signal processing circuit for generating at least color and luminance signals from the video signal selected by the selection switch:

wherein said signal processing circuit includes:

a reference clock generator;

a synchronization signal generator which generates a reference synchronization signal based on a reference clock signal generated from said reference clock signal generator;

an A/D converter which converts said internal and external video signals to a digital video signal;

a synchronization signal separating circuit which separates a synchronization signal from said digital video signal converted by said A/D converter;

a memory which stores the digital video signal converted by said A/D converter;

a memory write pulse generator which generates a write pulse for writing said digital video signal in said memory according to said reference clock signal of said reference clock signal generator;

a memory read pulse generator which generates a read pulse for reading said digital video signal from said memory according to said reference clock signal of said reference clock signal generator;

a difference detecting circuit which detects a difference between the synchronization signal generated by said synchronization signal generator and the synchronization signal separated by said synchronization signal separating circuit; and a horizontal time-base correcting circuit which corrects a horizontal time-base of the digital video signal read out from said memory.

2. A video camera apparatus as set forth in claim 1, wherein said synchronization signal separating circuit includes an analog synchronization signal separating circuit which separates a synchronization signal from an analog video composite signal received from said A/D converter.

3. A video camera apparatus comprising:

an A/D converter which converts an analog composite color signal to a digital signal;

a synchronization signal separating circuit which separates a synchronization signal from the converted digital composite color signal;

a phase error detecting circuit which detects a phase difference between the synchronization signal separated by said digital synchronization signal separating circuit and a synchronization signal component contained in the analog composite color signal; and a center moving circuit which moves a center of the video component of the converted digital composite color signal in response to a result of said phase error detecting circuit.

4. A video camera apparatus as set forth in claim 3, wherein said phase error detecting circuit includes:

level holding circuits which holds a signal level as a reference when said digital synchronization signal separating circuit separates the synchronization signal and a plurality of levels of the composite color signal immediately before and after said reference signal level; and a phase difference calculating circuit which calculates, on the basis of the signal levels held by said level holding circuits, a phase difference between a timing when the composite color signal reaches said reference level and the synchronization signal actually generated by said synchronization signal separating circuit.

5. A video camera apparatus as set forth in claim 3, wherein said center moving circuit includes an interpolation circuit which replaces the signal of the video component by the output of said interpolation circuit.

6. A video camera apparatus comprising:

an A/D converter which converts an analog composite color signal to a digital signal;

a digital signal processing circuit which processes the converted digital composite color signal;

a synchronization signal generating circuit which generates a synchronization signal for determining a timing of processing operation of the digital signal processing circuit;

a synchronization signal separating circuit which separates a synchronization signal from the analog composite color signal;

a phase error detecting circuit which detects a phase difference between the synchronization signal separated by said analog synchronization signal separating circuit and the synchronization signal generated by said synchronization signal generating circuit; and a center moving circuit which moves a center of a video component of the converted digital composite color signal in response to a result of said phase error detecting circuit.

7. A video camera apparatus as set forth in claim 6, wherein said center moving circuit includes an interpolation circuit which replaces signals of a video component by the output of said interpolation circuit.

8. A video camera apparatus as set forth in claim 1, wherein an amount of time-base correction carried out by said horizontal time-base correcting circuit is a reciprocal of said difference.

9. A video camera apparatus as set forth in claim 1, further comprising a compressor which converts data output from said signal processing circuit to compressed data.

10. A video camera apparatus as set forth in claim 1, wherein said memory is a RAM.

* * * * *